United States Patent [19]

Marlowe

[11] Patent Number: 5,416,653
[45] Date of Patent: * May 16, 1995

[54] CARTRIDGE HANDLING APPARATUS AND METHOD WITH MOTION-RESPONSIVE EJECTION

[75] Inventor: Christian P. Marlowe, Nederland, Colo.

[73] Assignee: Exabyte Corporation, Boulder, Colo.

[ * ] Notice: The portion of the term of this patent subsequent to Aug. 17, 2010 has been disclaimed.

[21] Appl. No.: 62,547

[22] Filed: May 7, 1993

Related U.S. Application Data

[63] Continuation of Ser. No. 655,539, Feb. 14, 1991, Pat. No. 5,237,467.

[51] Int. Cl.⁶ .................. G11B 15/68; G11B 5/008; G06K 15/00
[52] U.S. Cl. .................. 360/92; 360/96.5; 235/383
[58] Field of Search .................. 360/92, 96.5; 369/34–39; 235/383

[56] References Cited

U.S. PATENT DOCUMENTS

| | | | |
|---|---|---|---|
| 3,852,819 | 12/1974 | Staar | 360/92 |
| 3,854,604 | 12/1974 | Peterson et al. | 360/92 |
| 3,879,758 | 4/1975 | Pyles | 360/92 |
| 4,510,539 | 4/1985 | Young | 360/92 |
| 4,731,682 | 3/1988 | Nishiyama et al. | 360/92 |
| 4,779,152 | 10/1988 | Dimond et al. | 360/92 |
| 4,891,720 | 1/1990 | Grant et al. | 360/92 |
| 4,965,673 | 10/1990 | Bozzo et al. | 360/92 |
| 5,059,772 | 10/1991 | Younglove | 360/92 |

*Primary Examiner*—A. J. Heinz
*Assistant Examiner*—Jefferson Evans
*Attorney, Agent, or Firm*—Nixon & Vanderhye

[57] ABSTRACT

An apparatus (24) and method for selectively engaging and ejecting a cartridge (99) containing an information storage medium. The apparatus comprises a frame assembly (42) and a drive (44) for driving the frame assembly along a path of axial displacement (84). Cartridge engagement members (46) are attached to the frame assembly for engaging a cartridge. A detector (50) is connected to the frame assembly in a manner to travel essentially in unison with the frame assembly as the frame assembly travels along the path of axial displacement. A cartridge ejector (52) is attached to the frame assembly and responsively coupled to the detector for ejecting a cartridge held by the cartridge engagement members when the detector and the frame assembly cease to travel in unison with one another. A solenoid actuator (100) has a plunger (104) which moves from a first position into a second position when a cartridge is to be ejected, thereby extending into the path of the detector so as to stop the axial displacement of the detector relative to the frame assembly.

21 Claims, 4 Drawing Sheets

CARTRIDGE HANDLING APPARATUS AND METHOD WITH MOTION-RESPONSIVE EJECTION

This is a continuation of application Ser. No. 07/655,539, filed Feb. 14, 1991, now U.S. Pat. No. 5,237,467.

BACKGROUND

1. Field of Invention

This invention pertains to method and apparatus for handling cartridges of the type which house an information storage medium, such as magnetic tape.

2. Prior Art and Other Considerations

Cartridges, also known as cassettes, have recently become popular units for housing information storage media, such as magnetic tape. For example, cartridges housing 8 mm magnetic tape are now widely used in connection with the storage of data. For the data to be utilized, the cartridge must be loaded into a tape drive wherein tape read and write operations occur. In many applications, data of interest may be recorded on a plurality of such cartridges, making it necessary to load and retrieve the plurality of cartridges with respect to the drive.

In order to automate the loading and retrieval of cartridges, an automated cartridge library has been developed, as disclosed in U.S. Pat. No. 4,972,277, entitled CARTRIDGE TRANSPORT ASSEMBLY AND METHOD OF OPERATION THEREOF, which is commonly assigned herewith and incorporated herein by reference. The automated cartridge library includes a cartridge transport assembly which has a pair of engagement fingers. The engagement fingers are oriented and configured to engage notches provided on opposite edges of a standard 8 mm magnetic tape cartridge. When the cartridge is positioned for loading, abutment of the cartridge with a drive or storage rack forces the cartridge flush against the cartridge transport assembly and depresses a plunger borne by the assembly. When depression of the plunger is detected, a solenoid carried on the transport assembly operates via a linkage to rotate the engagement fingers out of the cartridge notches.

It is an object of the present invention to provide another cartridge handling apparatus and method which operates efficiently and compactly.

SUMMARY

An apparatus and method for selectively engaging and ejecting a cartridge of information storage medium. The apparatus comprises a frame assembly and drive means for driving the frame assembly along a path of axial displacement. Cartridge engagement means are attached to the frame assembly for engaging a cartridge whereby a cartridge is held by the frame assembly. A detection means is connected to the frame assembly in a manner to travel essentially in unison with the frame assembly as the frame assembly travels in the path of axial displacement. A cartridge ejecting means is attached to the frame assembly and responsively coupled to the detection means for ejecting a cartridge held by the cartridge engagement means when the detection means and the frame assembly cease to travel in unison with one another.

An actuator means has an actuator which moves from a first position into a second position when a cartridge is to be ejected. The actuator means is a solenoid having a plunger which extends into the path of the detection means so as to stop the axial displacement of said detection means when a cartridge is to be ejected. A linkage assembly connects the detection means to the cartridge ejection means in a manner whereby continued displacement of the frame assembly while the detection means is stopped causes the cartridge ejecting means to eject a cartridge from the frame assembly.

The detection means is a semi-cylindrical member having a major cylindrical axis which is colinear with an axis of the drive means. The detection means carries a fin. A linkage connects the fin of the detection means to the cartridge ejecting means.

The detection means has a first axial end and a second axial end with the drive means extending through the axial ends. The frame assembly has a frame assembly base portion having a bridge which extends in an axial sense between the axial ends of the detection means. The bridge of the frame assembly base portion engages the drive means.

The cartridge ejecting means comprises a plunger having a ejector end which extends through an aperture in the frame assembly.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
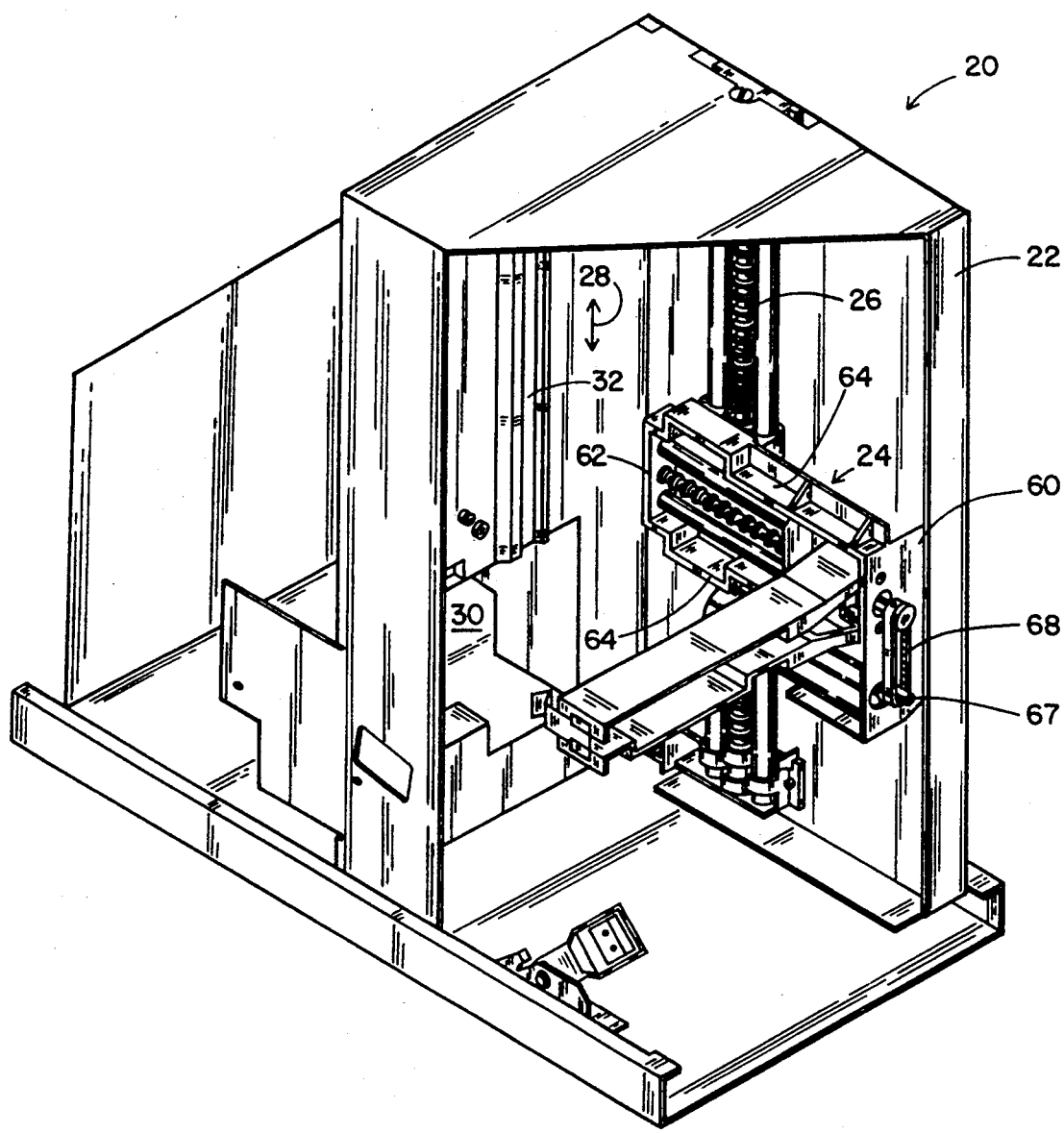
FIG. 1 is an isometric view of a cartridge handling assembly according to an embodiment of the invention installed in a cartridge handling subsystem.

FIG. 1 shows a cartridge handling subsystem 20 which includes a subsystem housing 22 and a cartridge handling assembly 24. The subsystem housing 22 has a vertical track 26 provided thereon upon which the cartridge handling assembly 24 travels in the direction shown by arrow 28.

Although not shown in FIG. 1, the subsystem housing 22 also contains (in cavity 30) a cartridge drive and one or more cartridge storage racks. One type of storage rack suitable for mounting on a mount rail 32 in the subsystem housing 22 is disclosed in U.S. patent application Ser. No. 07/434,979, filed 9 Nov. 1989, entitled CARTRIDGE RACK, which is commonly assigned and incorporated herein by reference.

Figure 2:
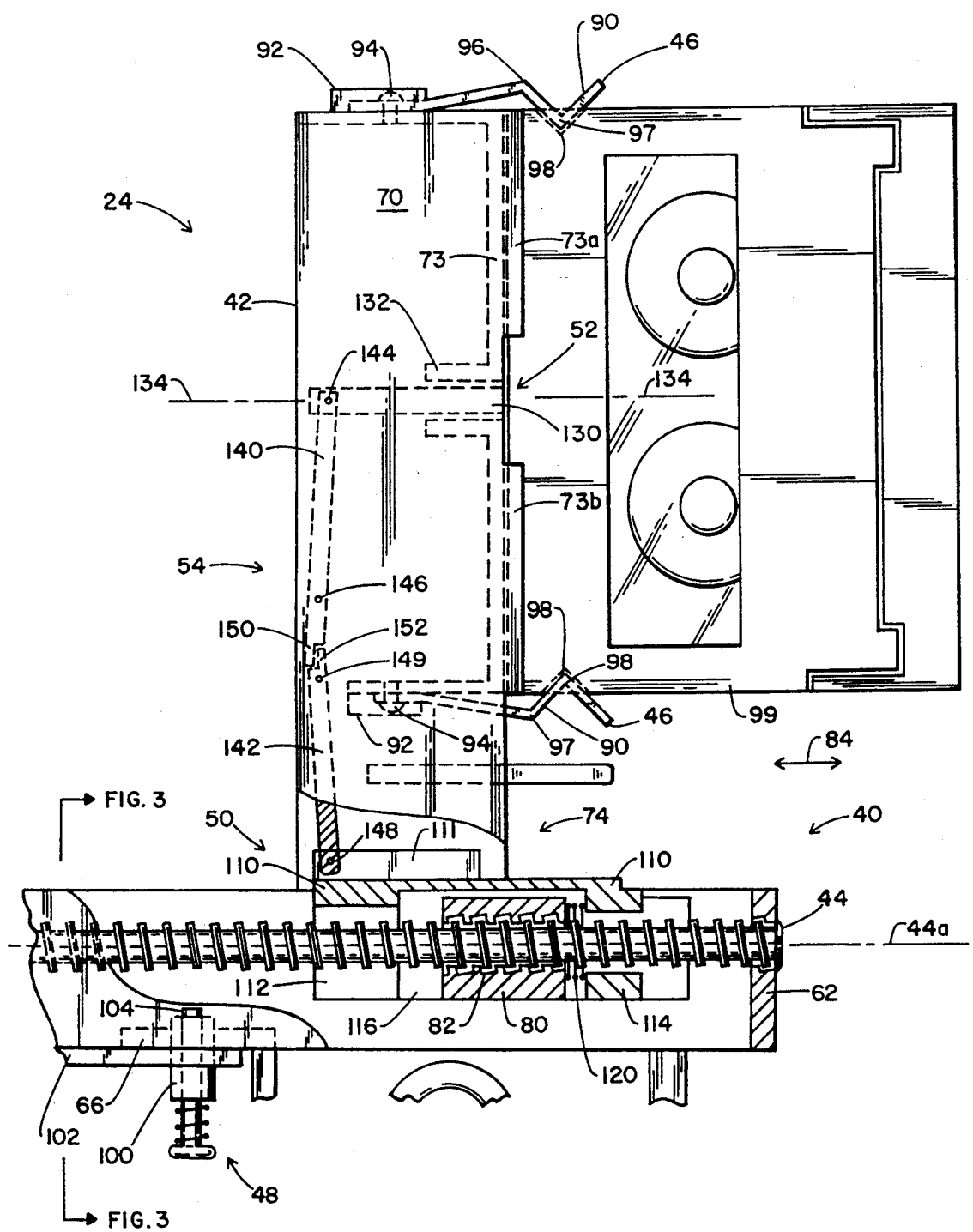
FIG. 2 is a partial top view of the cartridge handling assembly of the embodiment of FIG. 1, partially sectioned and showing the engagement of a cartridge.
Figure 3:
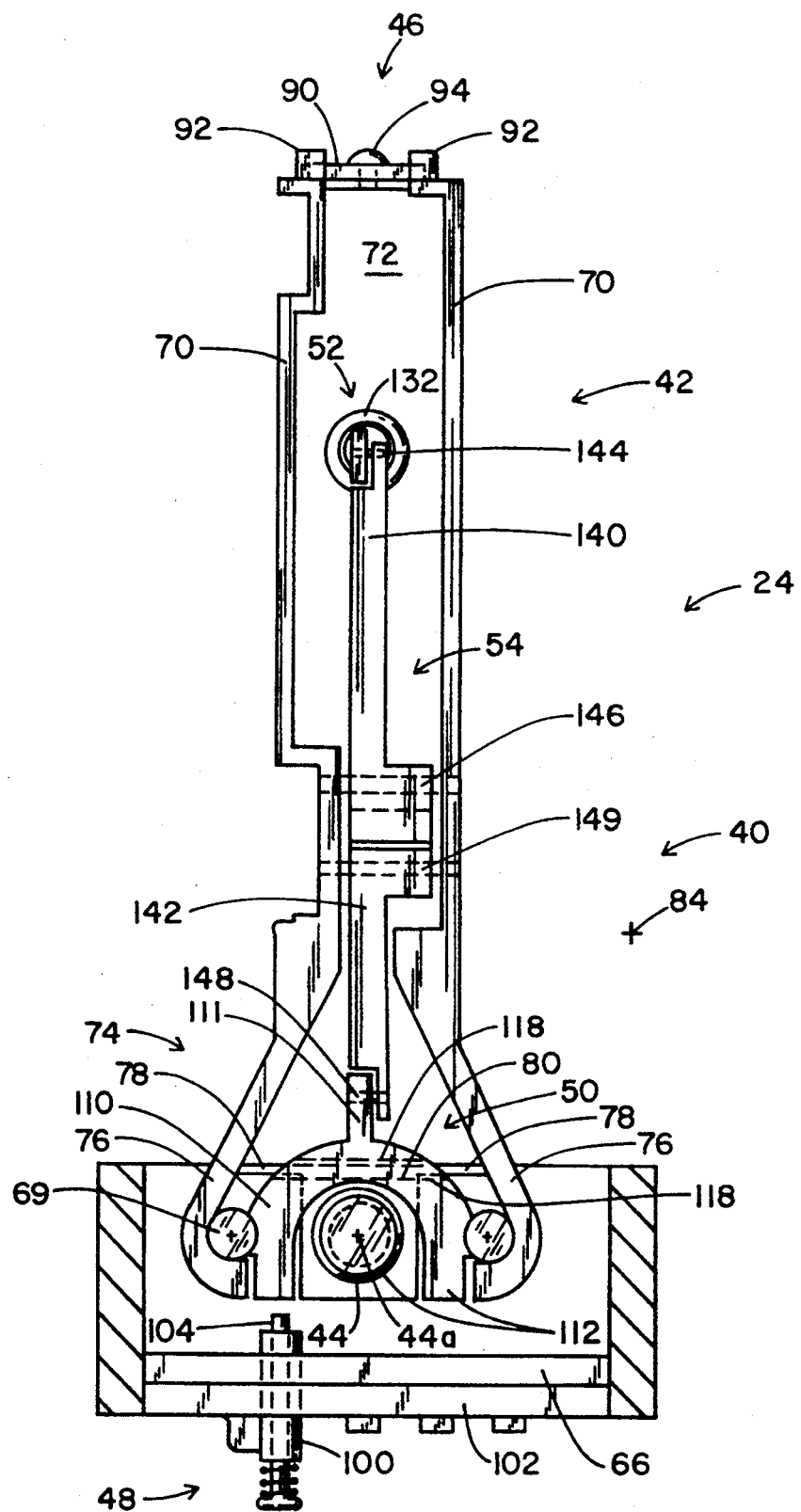
FIG. 3 is a front view of the cartridge handling system of the embodiment of FIG. 1 taken along the line 3—3.
Figure 4:
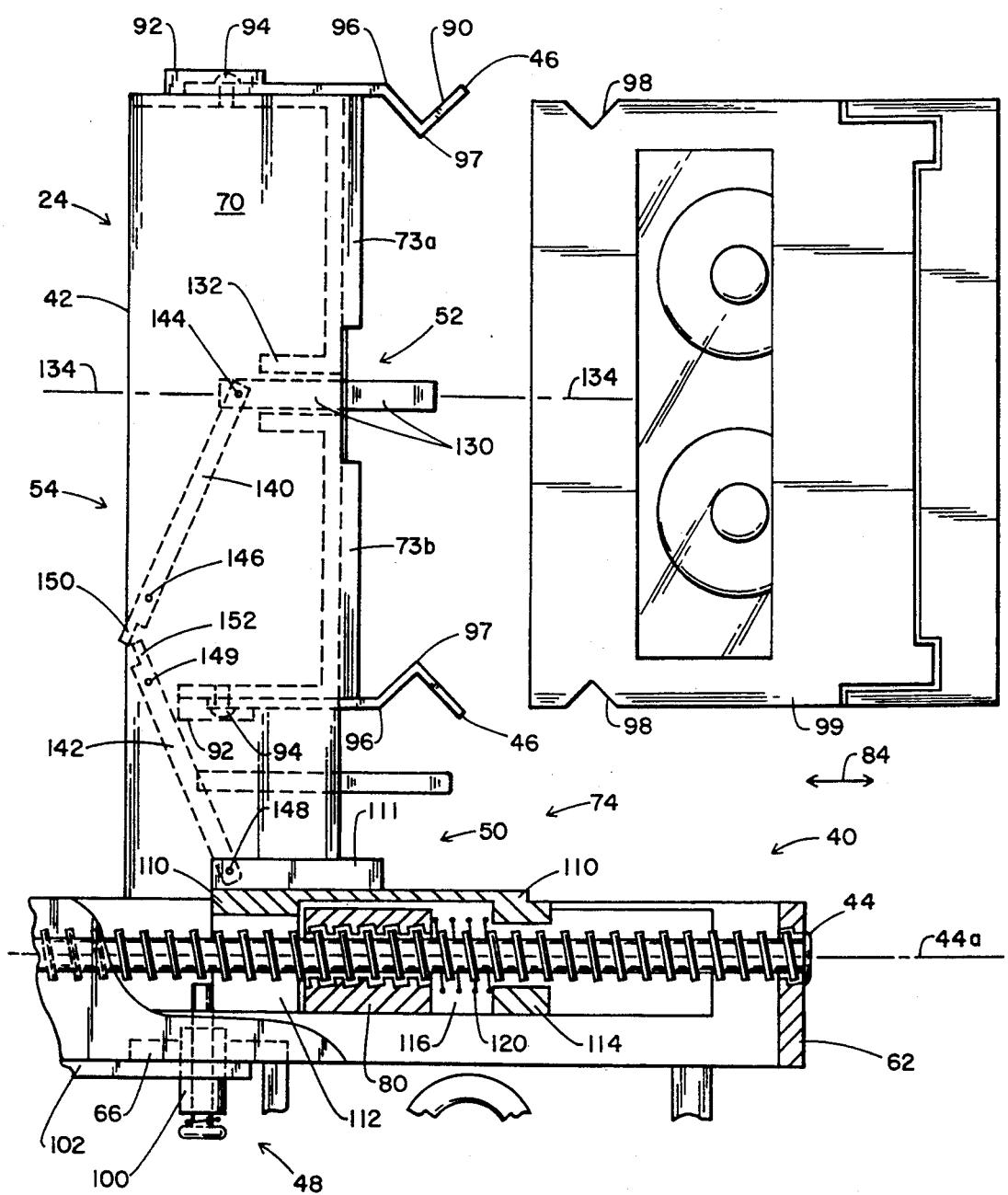
FIG. 4 is a partial top view of the cartridge handling assembly of the embodiment of FIG. 1, partially sectioned and showing the release of a cartridge.

The cartridge handling assembly 24 of the present invention is shown in more detail in FIGS. 2-4. The cartridge handling assembly 24 includes a mainframe 40 upon which are mounted a primarily horizontally-extending sub-frame assembly 42; drive means 44; cartridge engagement means 46; actuator means 48; detection means 50; cartridge ejecting means 52; and, a linkage assembly 54.

The mainframe 40 rides on the vertical track 26 by threading engagement with a helical drive shaft comprising the vertical track 26. As shown in FIG. 1, the mainframe 40 includes a front wall 60; a rear wall 62; two opposed side walls 64; and, a partial bottom wall 66 (see FIG. 2). Thus, the mainframe 40 has a generally rectangular shape. Having described the salient features of the mainframe 40, it should be understood that, unless expressly noted to the contrary, all subsequent references to "the frame" or to the "frame assembly" are to the sub-frame assembly 42.

The drive means 44 is a helically-threaded drive shaft rotatably carried between the front wall 60 and the rear wall 62 of the mainframe 40. The helical drive shaft 44 has a major axis represented by axis arrow 44a. As seen hereinafter, the drive means 44 carries the sub-frame assembly 42 and the detecting means 50. The helical drive shaft 44 is rotatably driven by a drive motor. As seen in FIG. 1, a power take-off 67 of the motor which drives the helical drive shaft 44 is connected to the drive shaft 44 by a transmission belt 68.

A pair of guide rails 69 similarly extend between the front wall 60 and the rear wall 62 of the mainframe 40. The guide rails 69 are parallel to the axis 44a of the helical drive shaft 44, with the helical drive shaft 44 being centrally located between the two guide rails 69.

The sub-frame assembly 42 has two parallel, spaced-apart frame sidewalls 70 which meet with a rearwardly facing frame cartridge abutment wall 73. The sidewalls 70 and the cartridge abutment wall 73 define a frame interior cavity 72. A pair of cartridge stabilization flanges 73a and 73b are provided on the cartridge abutment wall 73.

The frame sidewalls 70 extend toward the mainframe 40 to provide a frame base portion 74 comprising frame feet 76. As shown in FIG. 3, the distal ends of frame feet 76 are inwardly curled to partially extend around and ride upon the respective guide rails 69.

The frame base portion 74 has a bridge member 78 spanning the two frame feet 76. The bridge member 78 carries a frame carriage block 80. The frame carriage block 80 has a central bore 82 which is colinear with axis 44a of the helical drive shaft 44, and which is counterthreaded to engage the helical drive shaft 44.

By virtue of the counterthreaded engagement of the frame carriage block 80 with the helical drive shaft 44, the frame carriage block 80, and the entire frame assembly 42, is capable of travel in the direction shown by arrow 84 as the drive shaft 44 rotates. The direction of travel is thus parallel to the major axis 44a of the drive shaft 44. Thus, the frame assembly 42 has a path of axial displacement that is parallel to the major axis 44a of the helical drive shaft 44.

The cartridge engagement means 46 comprises a pair of resilient spring members 90 carried by the frame assembly 42. The resilient spring members 90 each have a proximal portion thereof which fits between an opposed pair of spring engagement tabs 92 provided on the frame assembly 42. The proximal end of each resilient spring member 90 is further secured to the frame assembly 42 by a fastener 94.

The distal end of each resilient spring member 90 has two bends 96 and 97, thereby giving the distal end of the spring member 90 a generally "V" shaped profile as seen from the side (FIG. 2). The bend 97 is positioned and sized to fit into a cartridge changer notch 98 of a cartridge 99. In the illustrated embodiment, the cartridge 99 is a cartridge of magnetic storage medium, such as an 8 mm magnetic tape cartridge.

The actuator means 48 includes a solenoid 100 mounted to extend both through the mainframe bottom wall 66 and a printed circuit board 102. The solenoid 100 includes an actuator or solenoid plunger 104 which, in its first or un-retracted position, does not interfere with the path of travel of the detection means 50. However, when in its extend or second position, the plunger 104 extends into the path of travel of the detection means 50 in the manner hereinafter described. The solenoid 100 is electrically connected to the printed circuit board 102 by an electrical wire 106.

The detection means 50 comprises a semi-cylindrical member 110 having a major cylindrical axis which is colinear with the axis 44a of the helical drive shaft 44. On its exterior surface, the semi-cylindrical member 110 carries an upstanding fin 111.

The semi-cylindrical member 110 comprising the detection means 50 has a first axial end 112 and a second axial end 114. As shown in FIG. 3, the exterior cylindrical surface of the member 110 is slightly grooved at symmetrical points thereof to accommodate the guide rails 69. The helical drive shaft 44 extends through the interior of the semi-cylindrical member 110, protrudes from the axial ends 112 and 114, and does not substantially contact or otherwise engage the member 110.

The interior of the semi-cylindrical member 110 is essentially hollow between the first axial end 112 and the second axial end 114, thereby forming a semi-cylindrical cavity 116. As shown in FIG. 2, the frame carriage block 80 resides in the cavity 116 between the first axial end 112 and the second axial end 114 of the member 110. The bridge member 78 which spans the frame feet 76 of the frame base portion 74 extends through a chord-like slot 118 provided in the semi-cylindrical member 110. The slot 118 runs essentially from the interior surface of the first axial end 112 to the interior surface of the second axial end 114 of the member 110. Thus, the bridge member 78 extends in an axial sense between the axial ends 112 and 114 of the detection means 50.

The detection means 50 is positionally biased along the path of axial displacement 84 with respect to the frame 42 by biasing means 120. In this regard, the biasing means 120 is a helical expansion spring which is concentric with the helical drive shaft 44. A first end of the biasing spring 120 is attached to the interior surface of the second axial end 114 of the detection means 50. A second end of the biasing spring 120 is attached to the rear end of the frame carriage block 80.

The solenoid 100 is mounted at a predetermined point on the mainframe bottom wall 66 and on the printed circuit board 102 relative to the path of axial travel 84, and particularly at a point on the path of axial travel related to a desired ejection of a cartridge from the cartridge engagement means 46. In this regard, the solenoid 100 is mounted at such a position on the mainframe bottom wall 66 and on the printed circuit board 102 so that the solenoid actuator or plunger 104, when actuated into an extended position, extends into the axial path of travel of the detection means 50. In this regard, as will be shown in FIG. 4, first axial end 112 of the semi-cylindrical member 110 will abut the extended plunger 104 of the solenoid 100, thereby precluding further movement of the detection means 50 in a frontward sense (to the left in FIG. 2).

The cartridge ejecting means 52 includes a plunger 130, a distal or ejector end of which is extendable through the cartridge abutment wall 73 provided on the frame 42. A hollow cylindrical guide 132 is provided for the plunger 130 on the interior of the cartridge abutment wall 73. The plunger 130 has a plunger major axis 134 which is essentially parallel to the path of axial displacement 84 of the frame assembly 42.

The cartridge ejecting means 52 is responsively connected to the detection means 50 by the linkage assembly 54. The linkage assembly includes a first linkage member 140 and a second linkage member 142. The first linkage member 140 has a first end which carries a pin 144. The pin 144 pivotally engages the proximal end of the plunger 130. Near its second end the first linkage member 140 is pivotally connected by a pivot pin 146 to the opposing side walls 70 of the frame 42.

In essentially mirror image relationship to the first linkage member 140, the second linkage member 142 has a first end which carries a pin 148. Pin 148 pivotally engages the fin 111 of the detection means 50. Near its second end the second linkage member 142 is pivotally connected by a pivot pin 149 to the opposing side walls 70 of the frame 42. The second ends of the first and second linkage member 140, 142 are provided with fingers 150 and 152, respectively. The fingers 150, 152 are so positioned relative to one another that pivotal motion of the first linkage member 140 in a counterclockwise sense about the pivot pin 146 causes a clockwise pivoting of the second linkage member 142 about the pivot pin 149.

OPERATION

In operation, a cartridge 99 is carried by the cartridge handling assembly 24 in the manner of FIG. 2 by virtue of the resilient force of the spring members 90 urging the bend 97 into the cartridge engagement notches 98 of the cartridge 99. When the cartridge 99 is carried by the cartridge handling assembly 24, the plunger 130 is in the retracted position shown in FIG. 2. The cartridge 99 is displaced along the path of arrow 84 in either a frontward sense (to the left in FIG. 2) or a rearward sense (to the right in FIG. 2) in accordance with the direction (clockwise or counterclockwise) in which the helical drive shaft 44 is rotated by its drive motor.

When the helical drive shaft 44 is rotated in a counterclockwise sense, the counterclockwise rotation of the helical drive shaft 44 causes the frame carriage block 80 which threadingly travels thereon to travel rearwardly (to the right as shown in FIG. 2). As the carriage block 80 travels rearwardly, so does the entire frame assembly 42 and the cartridge 99 engaged thereby. Moreover, the carriage block 80 and the biasing spring 120 attached thereto eventually also push rearwardly as well the semi-cylindrical member 110 comprising the detection means 50. Thus, in moving rearwardly, the frame assembly 52 and the detecting means 50 essentially move in unison along the path of axial displacement 40.

When the helical drive shaft 44 is rotated in a clockwise sense, the clockwise rotation of the helical drive shaft 44 causes the frame carriage block 80 which threadingly travels thereon to travel frontwardly (to the left as shown in FIG. 2). As the carriage block 80 travels frontwardly, so does the entire frame assembly 42 and the cartridge 99 engaged thereby. Moreover, the frontward displacement of the frame assembly 42 is transmitted through the pivot pin 149 and second linkage member 142 to the detecting means 50, with the result that the detecting means 50 is essentially pulled along to travel in a predetermined direction in unison with the frame assembly 42. In the illustrated embodiment, the predetermined direction is parallel to the path of axial displacement 84.

When a cartridge is to be released or ejected from the cartridge handling assembly 24, the printed circuit board 102 sends an electrical signal on wire 106 to the solenoid 100, thereby extending the plunger 104 of the solenoid 100 so that the plunger 104 assumes the position shown in FIG. 4. As the frame assembly 42 and the detecting means 50 move essentially in unison along the path of axial displacement 84 in the frontward direction (to the left in FIGS. 2 and 4) in the manner described in the preceding paragraph, the first axial end 112 of the detecting means 50 is ultimately stopped by the extended plunger 104 of the solenoid 100. As indicated above, the solenoid is so positioned relative to the path of axial displacement that, when the detecting means 50 detects the extended plunger 104 by striking the plunger 104, the cartridge 99 is in the preferred position along the axis 84 for ejection (e.g., release of the cartridge).

Although the extended plunger 104 of the solenoid 100 has stopped the detection means 50 in the manner just described, the frame assembly 42 continues to move frontwardly along the axial path of displacement (to the left in FIGS. 2 and 4). As the frame assembly 42 continues to move frontwardly, the second linkage member 142 is urged to pivot in a counterclockwise sense about the pivot pin 149. The counterclockwise pivoting of the second linkage member 142 is caused by the continued movement of the first end of the member 142 whilst the second end of the member 142, being connected to the fin 111 of the detection means 110, is braked. Simultaneously, the expansive spring force caused by the biasing spring 120 forces the carriage block 80 of the frame assembly 42 further frontwardly with respect to the semi-cylindrical member 110 of the detection means 50.

As the second linkage member 142 is urged to pivot in a counterclockwise sense about the pivot pin 149, the finger 152 provided on the second linkage member 142 contacts the finger 150 on the first linkage member 140 in such a manner as to urge the first linkage member 140 to pivot in a clockwise sense about the pivot pin 146. The clockwise force on the first linkage member 140 creates a force in the rearward direction acting on the cartridge 99 through the plunger 130.

When the extent of displacement of the frame assembly 42 relative to the stopped detection means 50 causes a sufficiently great pivoting force on the linkage members 140 and 142 and thus on the plunger 130 (e.g., a force which is greater than the spring biasing force by which the spring members 90 engage the cartridge notches 98), the force acting through the plunger 130 overcomes the resilient engagement force (acting through springs 90) to eject the cartridge 99 rearwardly (to the right in FIG. 4).

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. An apparatus for selectively engaging and ejecting a cartridge containing an information storage medium, the apparatus comprising:
    a base frame member;
    a helically threaded drive shaft having a major axis and rotatably carried by the base frame member;
    a cartridge engagement frame which selectively engages the cartridge, the cartridge engagement frame also engaging the drive shaft for reciprocating displacement along the major axis;
    an ejection mechanism for ejecting the cartridge from the cartridge engagement frame;
    a detector member displaceable in unison with the cartridge engagement frame along at least a portion of the major axis, the detector member comprising a semi-cylindrical member having a major cylindrical axis which is colinear with the major axis of the base frame member, the detection member carrying a fin;
    an actuator, mounted on the base frame member, selectively activatable to cause a rate of displacement differential between the cartridge engagement frame and the detector member;
    a linkage, connected to the detector member and the cartridge engagement frame, for causing ejection of the cartridge from the ejection mechanism in response to the rate of displacement differential, the linkage connecting the fin of the detection member to the cartridge engagement frame.

2. The apparatus of claim 1, wherein the semi-cylindrical member has an internal cavity, and wherein a biasing member is housed in the cavity for biasing the detector member relative to the cartridge engagement frame whereby the detector member is displaceable in unison with the cartridge engagement frame along at least a portion of the major axis.

3. The apparatus of claim 2, wherein the biasing member is a helical expansion spring.

4. The apparatus of claim 1 wherein the detector member is positionally biased relative to the cartridge engagement frame by a biasing member.

5. The apparatus of claim 1, wherein the detector member has opposing first and second ends and a cavity formed therebetween, wherein a portion of the cartridge engagement frame extends into the cavity.

6. The apparatus of claim 5, wherein the detector member is positionally biased relative to the cartridge engagement frame by a biasing member, and wherein a biasing member is accommodated in the cavity.

7. The apparatus of claim 1, wherein the linkage comprises:
    a first linkage member having a first end and a second end, the first end of the first linkage member being connected to the detector member, the first linkage member being pivotally attached to the cartridge engagement frame proximate the second end of the first linkage member;
    a second linkage member having a first end and a second end, the first end of the second linkage member being connected to the ejection mechanism and a second end of the second linkage member being pivotally connected to the cartridge engagement frame;
    wherein the second end of the first linkage member and the second end of the first linkage member contact one another whereby pivoting of the first linkage member in a first direction causes pivoting of the second linkage member in an opposite direction.

8. The apparatus of claim 1, wherein the ejection mechanism is a plunger which contacts the cartridge and pushes the cartridge out of contact with the cartridge engagement frame.

9. The apparatus of claim 1, wherein the actuator, when activated, causes the detector member to cease displacement along the major axis while the cartridge engagement frame continues displacement along the major axis.

10. An apparatus for selectively engaging and ejecting a cartridge containing an information storage medium, the apparatus comprising:
    a base frame member;
    a helically threaded drive shaft having a major axis and rotatably carried by the base frame member;
    a cartridge engagement frame which selectively engages the cartridge with a resilient engagement force, the cartridge engagement frame also engaging the drive shaft for reciprocating displacement along the major axis;
    an ejection mechanism for ejecting the cartridge from the cartridge engagement frame;
    a detector member displaceable in unison with the cartridge engagement frame along at least a portion of the major axis, the detector member comprising a semi-cylindrical member having a major cylindrical axis which is colinear with the major axis of the base frame member, the detection member carrying a fin;
    an actuator, mounted on the base frame member, selectively activatable to cause an extent of displacement between the cartridge engagement frame and the detector member;
    a linkage, connected to the detector member and the cartridge engagement frame, responsive to the extent of displacement for creating a force sufficient to overcome the resilient engagement force and thereby cause ejection of the cartridge from the ejection mechanisms, the linkage connecting the fin of the detection member to the cartridge engagement frame.

11. The apparatus of claim 10, wherein the semi-cylindrical member has an internal cavity, and wherein a biasing member is housed in the cavity for biasing the detector member relative to the cartridge engagement frame whereby the detector member is displaceable in unison with the cartridge engagement frame along at least a portion of the major axis.

12. The apparatus of claim 10, wherein the detector member is positionally biased relative to the cartridge engagement frame by a biasing member.

13. The apparatus of claim 10, wherein the detector member has opposing first and second ends and a cavity formed therebetween, wherein a portion of the cartridge engagement frame extends into the cavity.

14. The apparatus of claim 13, wherein the detector member is positionally biased relative to the cartridge engagement frame by a biasing member, and wherein a biasing member is accommodated in the cavity.

15. The apparatus of claim 10, wherein the linkage comprises:
    a first linkage member having a first end and a second end, the first end of the first linkage member being connected to the detector member, the first linkage member being pivotally attached to the cartridge engagement frame proximate the second end of the first linkage member;

a second linkage member having a first end and a second end, the first end of the second linkage member being connected to the ejection mechanism and a second end of the second linkage member being pivotally connected to the cartridge engagement frame;

wherein the second end of the first linkage member and the second end of the first linkage member contact one another whereby pivoting of the first linkage member in a first direction causes pivoting of the second linkage member in an opposite direction.

16. The apparatus of claim 10, wherein the ejection mechanism is a plunger which contacts the cartridge and pushes the cartridge out of contact with the cartridge engagement frame.

17. An apparatus for selectively engaging and ejecting a cartridge containing an information storage medium, the apparatus comprising:

a base frame member;

a helically threaded drive shaft having a major axis and rotatably carried by the base frame member;

at least one guide rail carried by the base frame member and extending parallel to the major axis of the drive shaft;

a cartridge engagement frame which selectively engages the cartridge, the cartridge engagement frame having two frame feet with at least one of the frame feet at least partially riding on the guide rail, the cartridge engagement frame further comprising a bridge member extending between the frame feet, the bridge member having a carriage frame block connected thereto, the carriage frame block being threaded to engage the drive shaft for reciprocating displacement along the major axis;

an ejection mechanism for ejecting the cartridge from the cartridge engagement frame;.

a detector member displaceable in unison with the cartridge engagement frame along at least a portion of the major axis, the detector member further having a cavity formed therein for accommodating the carriage frame block of the cartridge engagement frame and a slot formed therein through which extends the bridge member of the cartridge engagement frame;

an actuator, mounted on the base frame member, selectively activatable to stop displacement of the detector member along the major axis;

a linkage, connected to the detector member and the cartridge engagement frame, responsive to stopped displacement of the detector member for causing the ejection of the cartridge from the ejection mechanism.

18. The apparatus of claim 17, further comprising a biasing member for providing positional biasing of the detector member and the cartridge engagement frame.

19. The apparatus of claim 17, wherein the detector member comprises a semi-cylindrical member having a major cylindrical axis which is colinear with the major axis of the base frame member, and wherein the detection member carries a fin; and wherein the linkage connects the fin of the detection member to the cartridge engagement frame.

20. The apparatus of claim 19, wherein a biasing member is housed in the cavity for biasing the detector member relative to the cartridge engagement frame.

21. The apparatus of claim 19, wherein the linkage comprises:

a first linkage member having a first end and a second end, the first end of the first linkage member being connected to the detector member, the first linkage member being pivotally attached to the cartridge engagement frame proximate the second end of the first linkage member;

a second linkage member having a first end and a second end, the first end of the second linkage member being connected to the ejection mechanism and a second end of the second linkage member being pivotally connected to the cartridge engagement frame;

wherein the second end of the first linkage member and the second end of the first linkage member contact one another whereby pivoting of the first linkage member in a first direction causes pivoting of the second linkage member in an opposite direction.

* * * * *